US011641612B2

(12) United States Patent
Caporal Del Barrio et al.

(10) Patent No.: US 11,641,612 B2
(45) Date of Patent: May 2, 2023

(54) PATH DISCRIMINATION

(71) Applicant: Nokia Technologies Oy, Espoo (FI)

(72) Inventors: Samantha Caporal Del Barrio, Aalborg (DK); Bo Holm Bjerrum, Nibe (DK); Christian Rom, Aalborg (DK); Simon Svendsen, Aalborg (DK)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 17/155,751

(22) Filed: Jan. 22, 2021

(65) Prior Publication Data
US 2021/0235359 A1  Jul. 29, 2021

(30) Foreign Application Priority Data
Jan. 29, 2020 (FI) ..................................... 20205087

(51) Int. Cl.
*H04W 40/08* (2009.01)
*H04W 40/20* (2009.01)
*H04W 56/00* (2009.01)

(52) U.S. Cl.
CPC ........... *H04W 40/08* (2013.01); *H04W 40/20* (2013.01); *H04W 56/001* (2013.01)

(58) Field of Classification Search
CPC .... H04W 40/08; H04W 40/20; H04W 56/001
See application file for complete search history.

(56) References Cited

U.S. PATENT DOCUMENTS

| 2008/0032709 A1 | 2/2008 | Guvenc et al. ............ 455/456.2 |
| 2011/0074634 A1* | 3/2011 | Yeo ......................... G01S 5/021 342/463 |
| 2015/0188678 A1 | 7/2015 | Wu et al. |
| 2016/0249316 A1 | 8/2016 | Kudekar et al. .................. 5/284 |
| 2018/0234931 A1 | 8/2018 | Ly et al. |
| 2019/0181916 A1 | 6/2019 | Rofougaran et al. |
| 2019/0223140 A1 | 7/2019 | Grossmann et al. |
| 2019/0320405 A1 | 10/2019 | Pan et al. |
| 2019/0364535 A1* | 11/2019 | Sadiq .................. H04W 72/046 |
| 2019/0372688 A1 | 12/2019 | Sadiq et al. |
| 2020/0025853 A1* | 1/2020 | Sadiq .................... H04W 64/00 |
| 2020/0053712 A1* | 2/2020 | Josan .................. H04B 7/0408 |
| 2020/0145977 A1* | 5/2020 | Kumar .................. H04L 5/0048 |

(Continued)

FOREIGN PATENT DOCUMENTS

| CN | 108243476 A | 7/2018 |
| WO | 2008/017033 A2 | 2/2008 |

(Continued)

OTHER PUBLICATIONS

Extended European Search Report received for corresponding European Patent Application No. 21152674.4, dated Jun. 29, 2021, 8 pages.

(Continued)

*Primary Examiner* — Chae S Lee
(74) *Attorney, Agent, or Firm* — Harrington & Smith

(57) ABSTRACT

An apparatus, a method and a computer program is described comprising: receiving a plurality of synchronisation symbol blocks; classifying the received synchronisation symbol blocks based on delay relative to an expected reception time; and identifying one or more candidate line of sight paths on the basis of the delay relative to the expected reception time.

18 Claims, 11 Drawing Sheets

(56) References Cited

U.S. PATENT DOCUMENTS

| | | | | |
|---|---|---|---|---|
| 2021/0048502 | A1* | 2/2021 | Gummadi | H04B 7/043 |
| 2021/0075526 | A1* | 3/2021 | Pefkianakis | H04B 17/0085 |

FOREIGN PATENT DOCUMENTS

| | | |
|---|---|---|
| WO | 2019/079341 A1 | 4/2019 |
| WO | 2019/158187 A1 | 8/2019 |

OTHER PUBLICATIONS

Suzuki et al., "NLOS Multipath Detection by Using Machine Learning in Urban Environments", 30th International Tech Meeting of the Satellite Division of the Institute of Navigation, GNSS, Sep. 25-29, 2017, pp. 3958-3967.

"3rd Generation Partnership Project; Technical Specification Group Radio Access Network; Study on New Radio Access Technology Physical Layer Aspects (Release 14)", 3GPP TR 38.802, V14.2.0, Sep. 2017, pp. 1-144.

Chen et al., "Improved Robust TOA-Based Localization via NLOS Balancing Parameter Estimation", IEEE Transactions on Vehicular Technology, vol. 68, No. 6, Jun. 2019, pp. 6177-6181.

Khan et al., "Location Awareness in 5G Networks Using RSS Measurements for Public Safety Applications", IEEE Access, vol. 5, Sep. 15, 2017, pp. 21753-21762.

Guvenc et al., "A Survey on TOA Based Wireless Localization and NLOS Mitigation Techniques", IEEE Communications Surveys & Tutorials, vol. 11, No. 3, 2009, pp. 107-124.

Gu et al., "A Survey of Indoor Positioning Systems for Wireless Personal Networks", IEEE Communications Surveys & Tutorials, vol. 11, No. 1, 2009, pp. 13-32.

Xiang et al., "Channel Estimation for 3D MIMO System based on LOS/NLOS Identification", IET Communications, vol. 13, No. 7, Jan. 2019, pp. 898-904.

Salman et al., "On the Joint Estimation of the RSS-Based Location and Path-loss Exponent", IEEE Wireless Communications Letters, vol. 1, No. 1, Feb. 2012, pp. 34-37.

Shirahama et al., "RSS-based Localization in Environments with Different Path Loss Exponent for Each Link", VTC Spring 2008—IEEE Vehicular Technology Conference, May 11-14, 2008, pp. 1509-1513.

Zhang et al., "NLOS Signal Detection Based on Single Orthogonal Dual-Polarized GNSS Antenna", International Journal of Antennas and Propagation, vol. 2017, 2017, pp. 1-10.

Gezici, "A Survey on Wireless Position Estimation", Wireless Personal Communications, vol. 44, No. 3, 2008, pp. 263-282.

Zhekov et al., "Measurement of Attenuation by Building Structures in Cellular Network Bands", IEEE Antennas and Wireless Propagation Letters, vol. 17, No. 12, Dec. 2018, pp. 2260-2263.

Patent Cooperation Treaty Application No. PCT/EP2019/072028, "Non-Line-Of-Sight Path Detection For User Equipment Positioning In Wireless Networks", filed on Aug. 16, 2019, 53 pages.

Gadka et al., "Detection of the First Component of the Received LTE Signal in the OTDoA Method", Wireless Communications and Mobile Computing, vol. 2019, 2019, pp. 1-12.

Office action received for corresponding Finnish Patent Application No. 20205087, dated May 28, 2020, 8 pages.

* cited by examiner

PATH DISCRIMINATION

FIELD

The present specification relates to path discrimination in communication systems, such as identification of line of sight (LOS) and/or non-line of sight (NLOS) paths.

BACKGROUND

Path delays in communication systems can be used for many purposes, such as determining a position of a user device relative to a communication node. Some algorithms assume that such communications occur via line of sight (LOS) paths. There remains a need for further developments in this area.

SUMMARY

In a first aspect, this specification describes an apparatus comprising means for performing: receiving (e.g. at a user device from a base station or some other communication node) a plurality of synchronisation symbol blocks (e.g. SSB bursts); classifying the received synchronisation symbol blocks based on delay relative to an expected (e.g. scheduled) reception time; and identifying one or more candidate line of sight paths on the basis of the delay relative to the expected reception time (of the synchronisation symbol blocks). The timing of the synchronisation signals may be known both at the transmitter end and at the receiver end (e.g. in a connected mode). A delay may be identified by determining a position in time for each symbol block relative to an expected position in time for that block. By identifying line-of-sight (LOS) paths, LOS propagation times can be determined, for use (for example) in observed time-of-arrival algorithms. It should be noted that, in some embodiments, the delay relative to the expected reception time could be positive or negative (i.e. the relevant signal could arrive later than or earlier than expected, depending on device synchronisation).

The means may be further configured to perform: providing an output (e.g. a message to a base station or some other communication node) identifying the or each candidate line of sight (LOS) paths. The candidate LOS path(s) may be identified by providing the beam index of the LOS path(s). Alternatively, or in addition, the means may be further configured to perform: providing a corrected delay and/or a delay correction factor as an output.

In some example embodiments, the means are further configured to perform: identifying non-line of sights paths conveying synchronisation symbol blocks having a delay relative to the expected reception time in excess of a threshold amount; and excluding the identified non-line of sight paths from the candidate line of sight paths.

In some example embodiments, the means are further configured to perform ranking one or more of the candidate line of sight paths by received power, such as Reference Signal Receive Power (RSRP). The means may be further configured to provide: identifying the path with the highest identified received power as a shortest path (since the shortest path may be the most likely to be the line-of-sight path). The means may be further configured to perform: providing an output (e.g. a message to a base station or some other communication node) identifying (e.g. by providing the beam index of the line of sight path(s)) said shortest path (e.g. the path having shortest (or no) delay and the highest power). Note that the shortest may not always be the best path for communication. Nevertheless, knowing the shortest path (and hence the likely LOS path) can be useful in many circumstances.

In some example embodiments, the means are further configured to perform: measuring a channel impulse response for a received synchronisation symbol block; identifying a maximum power spike of the channel impulse response for each synchronisation symbol block; and comparing the time of the maximum power spike to the expected reception time to identify the delay relative to said expected (e.g. scheduled) reception time.

The means may be further configured to perform: calculating a corrected delay and/or a delay correction factor. The means may be further configured to perform: outputting said corrected delay and/or said delay correction factor (e.g. in response to a request, such as a localisation assistance enquiry). Calculating the delay correction factor may comprises determining a relative time difference between a communication path based on a non-line of sight path and a/the shortest path. Calculating the corrected delay may be based on the delay to the shortest path (e.g. a LOS path). For example, a user device may identified that a connected beam is a non-line-of-sight (NLOS) beam and identify another beam as a line-of-sight beam, and may then determine the time difference between the connected NLOS beam and the LOS path.

In some example embodiments, a calculation can be made (for example by a user device) of a corrected delay once a shorter path (e.g. a LOS path) has been identified. That corrected delay may, for example, be provided to a base station or some other communication node. Alternatively, or in addition, a calculated can be made (for example by a user device) of a delay correction factor. That delay correction factor may, for example, be provided to a base station or some other communication node. On receipt of a delay correction factor, a base station (or other communication node) may sum a previous delay estimate and the correction factor to determine a corrected delay.

The means may be further configured to perform: determining a beam index of a/the shortest path and/or of each candidate line of sight path.

The means may be further configured to perform: receiving a localisation assistance enquiry; and providing one or more of a beam index, a delay correction factor or a corrected delay of a shortest path (e.g. a LOS path) in response to said localisation assistance enquiry.

In a second aspect, this specification describes an apparatus (e.g. a base station or some other communication node) comprising means for performing: sending a first enquiry (e.g. a localisation assistance enquiry or an NLOS request); sending a plurality of synchronisation symbol blocks (e.g. SSB bursts); and receiving an indicator (e.g. a beam index) and/or a delay correction factor of a line of sight path from a user device in response to said first enquiry. In a connected mode, the timing of the synchronisation symbol blocks may be known at both the transmitter end (e.g. the base station or communication node referred to above) and the receiver end (e.g. a user device).

The said means (in either the first or second aspect described above) may comprise: at last one processor; and at least one memory including computer program code, the at least one memory and the computer program code configured to, with the at least one processor, cause the performance of the apparatus.

In a third aspect, this specification describes a method comprising: receiving (e.g. at a user device from a base station or some other communication node) a plurality of synchronisation symbol blocks (e.g. SSB bursts); classifying the received synchronisation symbol blocks based on delay relative to an expected (e.g. scheduled) reception time; and identifying one or more candidate line of sight paths on the basis of the delay relative to the expected reception time (of the synchronisation symbol blocks). The timing of the synchronisation signals may be known both at the transmitter end and at the receiver end (e.g. in a connected mode). A delay may be identified by determining a position in time for each symbol block relative to an expected position in time for that block.

An output may be provided, such as a message to a base station or some other communication node) identifying the or each candidate line of sight (LOS) paths. The candidate LOS path(s) may be identified by providing the beam index of the LOS path(s). Alternatively, or in addition, a corrected delay and/or a delay correction factor as the said output.

Some example embodiments comprise: identifying non-line of sights paths conveying synchronisation symbol blocks having a delay relative to the expected reception time in excess of a threshold amount; and excluding the identified non-line of sight paths from the candidate line of sight paths.

Some example embodiments comprise ranking one or more of the candidate line of sight paths by received power (e.g RSRP). The path with the highest identified received power may be identified as a shortest path (since the shortest path may be the most likely to be the line-of-sight path).

Some example embodiments comprise: measuring a channel impulse response for a received synchronisation symbol block; identifying a maximum power spike of the channel impulse response for each synchronisation symbol block; and comparing the time of the maximum power spike to the expected reception time to identify the delay relative to said expected (e.g. scheduled) reception time.

Some example embodiments comprise: calculating a corrected delay and/or a delay correction factor. The corrected delay and/or the delay correction factor may be provided as an output (e.g. in response to a request, such as a localisation assistance enquiry).

Some example embodiments comprise: determining a beam index of a/the shortest path and/or of each candidate line of sight path.

Some example embodiments comprise: receiving a localisation assistance enquiry; and providing one or more of a beam index, a delay correction factor or a corrected delay of a shortest path (e.g. a LOS path) in response to said localisation assistance enquiry.

In a fourth aspect, this specification describes a method comprising: sending a first enquiry (e.g. a localisation assistance enquiry or an NLOS request); sending a plurality of synchronisation symbol blocks (e.g. SSB bursts); and receiving an indicator (e.g. a beam index) and/or a delay correction factor of a line of sight path from a user device in response to said first enquiry. In a connected mode, the timing of the synchronisation symbol blocks may be known at both the transmitter end (e.g. the base station or communication node referred to above) and the receiver end (e.g. a user device).

In a fifth aspect, this specification describes an apparatus configured to perform any method as described with reference to the third or fourth aspect.

In a sixth aspect, this specification describes computer-readable instructions which, when executed by computing apparatus, cause the computing apparatus to perform any method as described with reference to the third or fourth aspect.

In a seventh aspect, this specification describes a computer program comprising instructions for causing an apparatus to perform at least the following: receiving (e.g. at a user device from a base station or some other communication node) a plurality of synchronisation symbol blocks (e.g. SSB bursts); classifying the received synchronisation symbol blocks based on delay relative to an expected (e.g. scheduled) reception time; and identifying one or more candidate line of sight paths on the basis of the delay relative to the expected reception time (of the synchronisation symbol blocks).

In an eighth aspect, this specification describes a computer program comprising instructions for causing an apparatus to perform at least the following: sending a first enquiry (e.g. a localisation assistance enquiry or an NLOS request); sending a plurality of synchronisation symbol blocks (e.g. SSB bursts); and receiving an indicator (e.g. a beam index) and/or a delay correction factor of a line of sight path from a user device in response to said first enquiry.

In a ninth aspect, this specification describes a computer-readable medium (such as a non-transitory computer-readable medium) comprising program instructions stored thereon for performing at least the following: receiving (e.g. at a user device from a base station or some other communication node) a plurality of synchronisation symbol blocks (e.g. SSB bursts); classifying the received synchronisation symbol blocks based on delay relative to an expected (e.g. scheduled) reception time; and identifying one or more candidate line of sight paths on the basis of the delay relative to the expected reception time (of the synchronisation symbol blocks).

In a tenth aspect, this specification describes a computer-readable medium (such as a non-transitory computer-readable medium) comprising program instructions stored thereon for performing at least the following: sending a first enquiry (e.g. a localisation assistance enquiry or an NLOS request); sending a plurality of synchronisation symbol blocks (e.g. SSB bursts); and receiving an indicator (e.g. a beam index) and/or a delay correction factor of a line of sight path from a user device in response to said first enquiry.

In an eleventh aspect, this specification describes an apparatus comprising: at least one processor; and at least one memory including computer program code which, when executed by the at least one processor, causes the apparatus to: receive (e.g. at a user device from a base station or some other communication node) a plurality of synchronisation symbol blocks (e.g. SSB bursts); classify the received synchronisation symbol blocks based on delay relative to an expected (e.g. scheduled) reception time; and identify one or more candidate line of sight paths on the basis of the delay relative to the expected reception time (of the synchronisation symbol blocks).

In a twelfth aspect, this specification describes an apparatus comprising: at least one processor; and at least one memory including computer program code which, when executed by the at least one processor, causes the apparatus to: send a first enquiry (e.g. a localisation assistance enquiry or an NLOS request); send a plurality of synchronisation symbol blocks (e.g. SSB bursts); and receive an indicator (e.g. a beam index) and/or a delay correction factor of a line of sight path from a user device in response to said first enquiry.

In a thirteenth aspect, this specification describes an apparatus (e.g. as part of a user device) comprising: an input module or interface (or some other means) for receiving a plurality of synchronisation symbol blocks; a classification module (or some other means) for classifying the received synchronisation symbol blocks based on delay relative to an expected reception time; and an output module (or some other means) for identifying one or more candidate line of sight paths on the basis of the delay relative to the expected reception time.

In a fourteenth aspect, this specification describes an apparatus (e.g. as part of a base station or some other communication node) comprising: an output module (or some other means) for sending a first enquiry; a synchronisation symbol module for sending a plurality of synchronisation symbol blocks; and an input module (or some other means) for receiving an indicator (e.g. a beam index) and/or a delay correction factor of a line of sight path from a user device in response to said first enquiry.

BRIEF DESCRIPTION OF THE DRAWINGS

Example embodiments will now be described, by way of example only, with reference to the following schematic drawings, in which.

DETAILED DESCRIPTION

Figure 1:
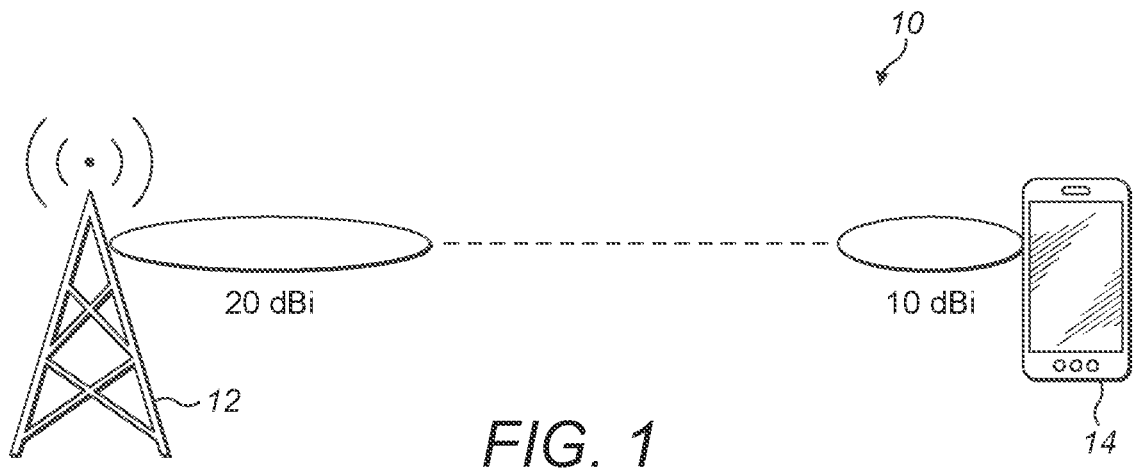
FIGS. 1 to 5 are block diagrams of systems in accordance with example embodiments.

The scope of protection sought for various embodiments of the invention is set out by the independent claims. The embodiments and features, if any, described in the specification that do not fall under the scope of the independent claims are to be interpreted as examples useful for understanding various embodiments of the invention.

In the description and drawings, like reference numerals refer to like elements throughout.

FIG. 1 is a block diagram of a system, indicated generally by the reference numeral 10, in accordance with an example embodiment. The system 10 comprises a base station 12, or some similar communication node, in communication with a user device 14. In the system 10, the communication is a line of sight (LOS) communication (e.g. since beams of the base station 12 and the user device 14 are aligned and are in a line of sight of each other).

Some 5th Generation (5G) New Radio (NR) applications assume that communications occur via LOS connection. This assumption is not always correct.

Figure 2:
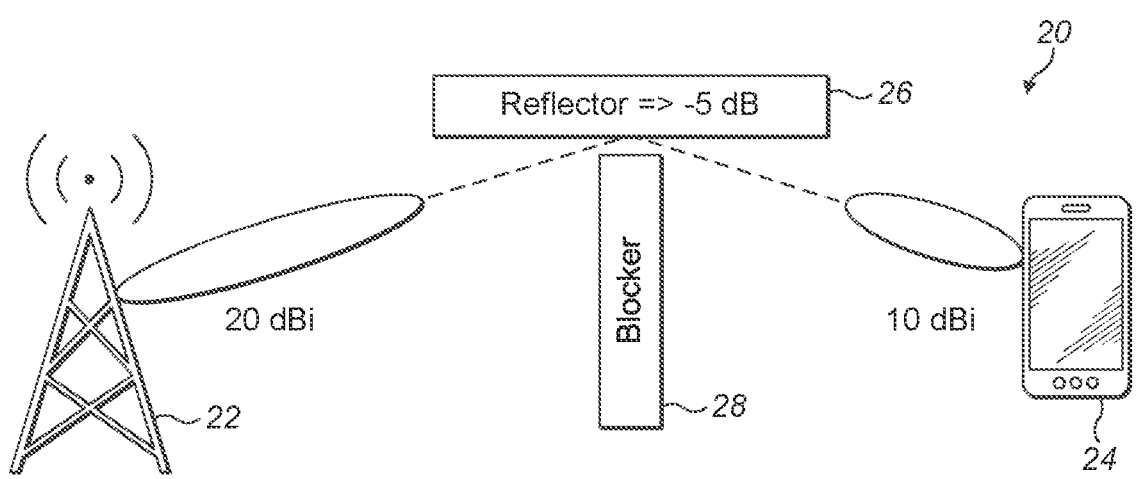

FIG. 2 is a block diagram of a system, indicated generally by the reference numeral 20, in accordance with an example embodiment. The system 20 comprises a base station 22, or some similar communication node, in communication with a user device 24. In the system 20, the communication is a non-line of sight (NLOS) communication via a reflector 26 (for example, due to the presence of a blocker 28 in the LOS path).

In rich indoor and urban scenarios, NLOS communication (e.g. due to reflections) can provide good communications links.

The time taken for a signal to travel from a base station (such as the base station 12 or 22) to a user device (such as the user device 14 or 24) can be used to determine the distance between the base station and the user device. Such determinations can be used, for example, in localisation algorithms (e.g. using the principles of triangulation).

Identifying whether a received signal is in line of sight (LOS) or in non-LOS (NLOS) is a step of some localization algorithms. Observed Time Difference of Arrival (OTDOA)-based methods may rely on the knowledge of LOS propagation and errors can occur in the event of mischaracterizing a LOS channel as an NLOS channel (or vice-versa). With OTDOA-based methods, the user device may compute the OTDOA of a signal from at least three base stations (from known locations) and assume LOS propagation to deduce its location. Evidently, multipath and NLOS scenarios can introduce estimation errors.

Moreover, the accuracy of the channel estimation may be improved with a priori knowledge of LOS or NLOS conditions per user. That is because the channel estimation may be sensitive to the noise estimation, which is not as accurate for NLOS than for the LOS scenarios.

Figure 3:
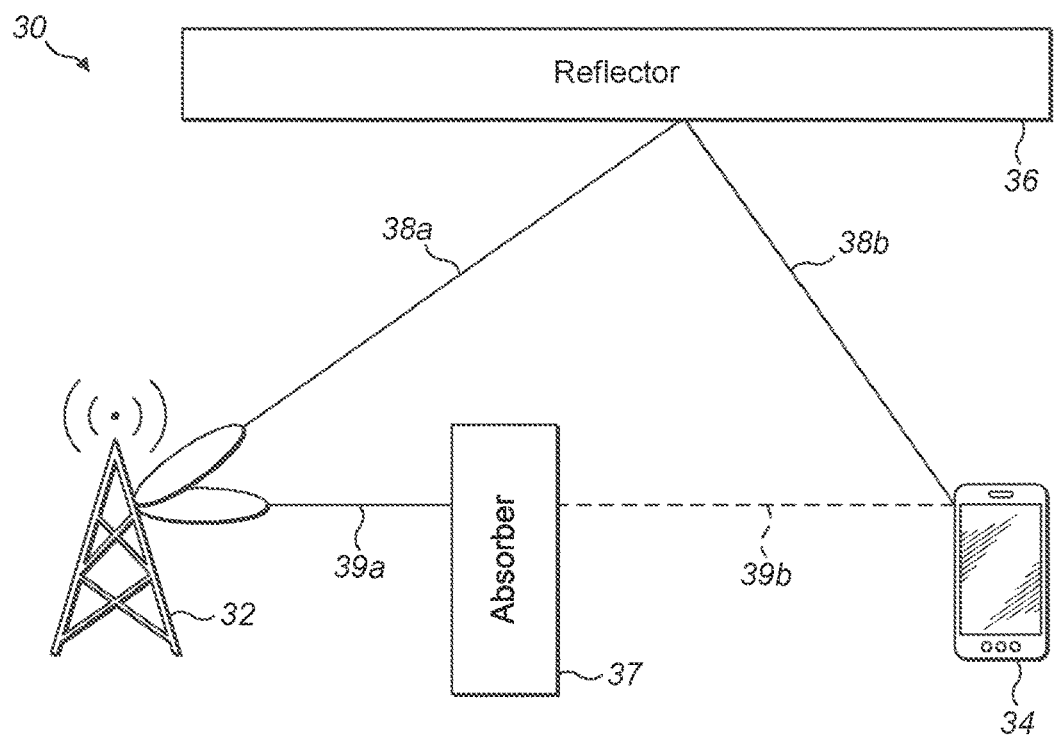

FIG. 3 is a block diagram of a system, indicated generally by the reference numeral 30, in accordance with an example embodiment. The system 30 comprises a base station 32, or some similar communication node, in communication with a user device 34. The system 30 further comprises a reflector 36 and an absorber 37.

The base station 32 comprises an antenna that has multiple beams (e.g. 64 beams, as discussed below) operating in multiple directions (two or which are shown in FIG. 3). In the system 30, communications between the base station 32 and the user device 34 occur via a connected beam 38. The connected beam 38 is reflected by the reflector 36. Thus, the connected beam 38 comprises a first part 38a between the base station 32 and the reflector 36 and a second part 38b between the reflector 36 and the user device 34.

A line of sight (LOS) beam 39 also exists between the base station 32 and the user device 34. The LOS beam 39 is partially blocked by the absorber 37. Thus, the LOS beam 39 comprises a first part 39a between the base station 32 and the absorber 37 and a second part 39b between the absorber 37 and the user device 34.

In the example system 30, the connected path 38 is stronger than the LOS path 39, such that the connected path 38 is preferred for data transfer. However, as described further below, if the LOS path 39 is effective for communications between the base station 32 and the user device 34, then the LOS connection can be exploited, for example of localisation purposes (e.g. in addition to the use of the path 38 for data transfer).

Figure 4:
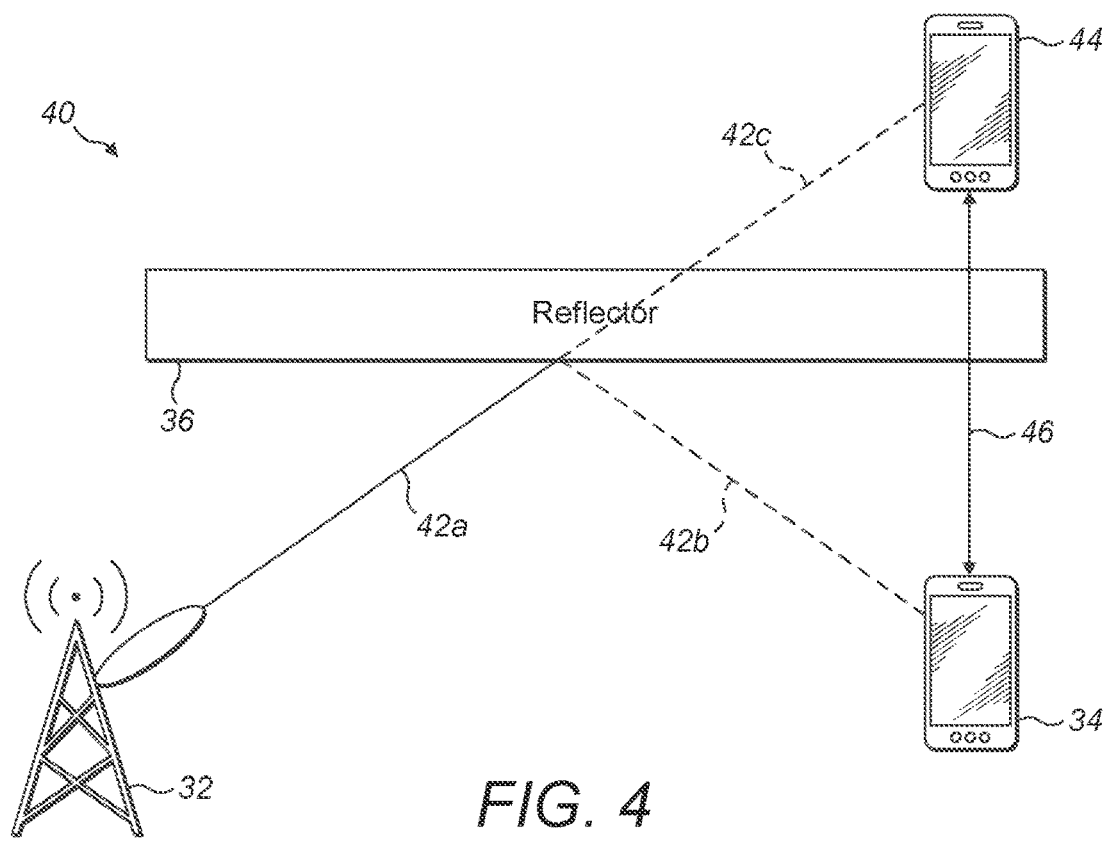

FIG. 4 is a block diagram of a system, indicated generally by the reference numeral 40, in accordance with an example embodiment. The system 40 comprises the base station (or similar communication node) 32, the user device 34 and the reflector 36 of the system 30 described above. The system 40 also shows a connected beam 42. The connected beam 42 is reflected by the reflector 36. Thus, the connected beam 42 comprises a first part 42a between the base station 32 and the reflector 36 and a second part 42b between the reflector 36 and the user device 34.

If the path 42 is incorrectly assumed to be a LOS path, then, from the viewpoint of the base station 32, the connected beam 42a will continue in a straight line, as indicated by the apparent beam path 42c. In this scenario, a detected position of the user device may be as indicated by the apparent user device 44. Thus, the positioning would have a localization error indicated by the arrow 46.

The assumption of 5G NR connections relying on LOS paths may not be valid in environments presenting a rich multipath and may lead to inaccuracies in localization techniques, if the relevant user device (e.g. the user device 34) is not aware of the NLOS propagation scenario. For example, it might occur that the reflected path offers a better link budget than the LOS path (due to the presence of an absorber in the LOS path for example), as depicted in FIGS. 3 and 4. In such scenario the connected beam 38 is not the LOS beam.

Figure 5:
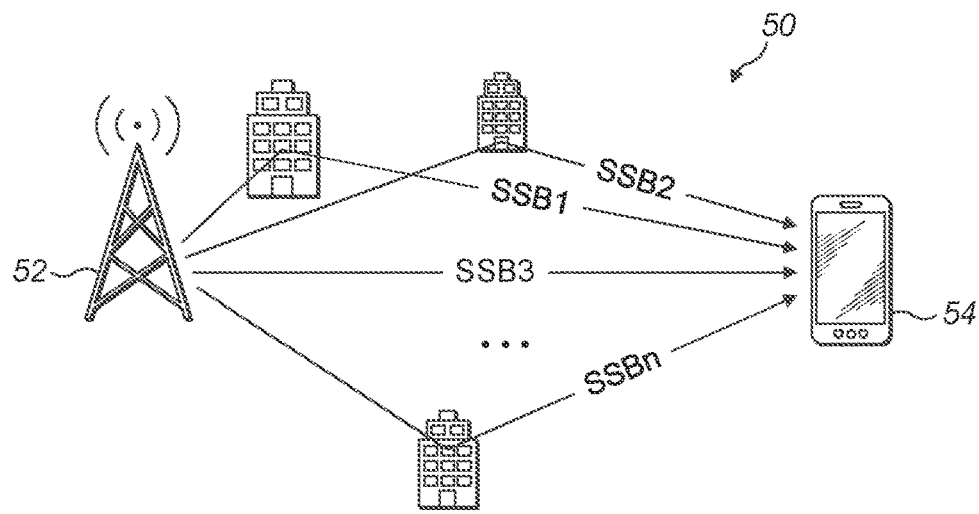

FIG. 5 is a block diagram of a system, indicated generally by the reference numeral 50, in accordance with an example embodiment. The system 50 comprises a base station 52, or some similar communication node, in communication with a user device 54.

In the system 50, a plurality of synchronisation symbol blocks (SSBs) are transmitted from the base station 52 to the user device 54 (e.g. using different beams of an antenna of the base station). Thus, different beams take different paths between the base station 52 and the user device 54, such that one or more paths are line of sight (LOS) and one or more paths are non-line of sight (NLOS) paths. For example, in FIG. 5, paths SSB1, SSB2, SSB3 and SSBn are shown (of which only SSB3 is a LOS path).

Figure 6:
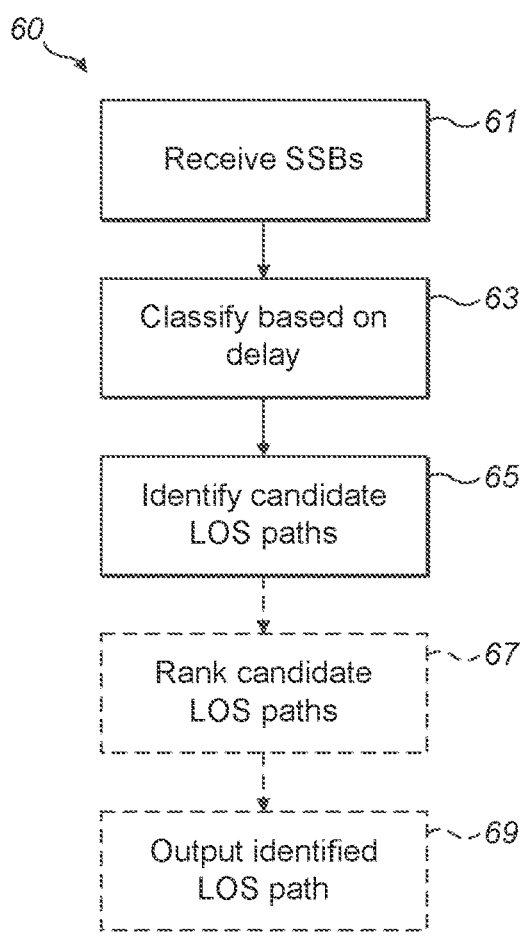
FIG. 6 is a flow chart showing an algorithm in accordance with an example embodiment.

FIG. 6 is a flow chart showing an algorithm, indicated generally by the reference numeral 60, in accordance with an example embodiment. The algorithm 60 may be implemented at the user device 54 of the system 50 described above.

The algorithm 60 starts at operation 61, where the user device 54 receives a plurality of synchronisation symbol blocks from the base station 52. In one example embodiment, 64 SSBs are sent, sequentially, in different directions (although, of course, many variants to such an arrangement are possible). The user device 54 may receive a subset of the transmitted blocks, with many being non-line of sight (NLOS) beams and perhaps one or a few being line of sight (LOS) beams Details of the SSBs received, and the relative delays of the SSBs, can provide information regarding the paths between the base station and the user device, as discussed in detail below.

At operation 63, the received synchronisation symbol blocks are classified based on delay relative to an expected (e.g. scheduled) reception time. For example, in a connected mode, the timing of a synchronisation block is known both at the transmitter end (i.e. at the base station 52) and at the received end (i.e. at the user device 54).

At operation 65, one or more candidate line of sight (LOS) paths are identified (e.g. by identifying a beam index of the/each candidate LOS path) on the basis of the delay relative to the scheduled or expected reception time.

By way of example, the operation 65 may be involve: identifying non-line of sight (NLOS) paths conveying synchronisation symbol blocks having a delay relative to the scheduled reception time in excess of a threshold amount; and excluding the identified non-line of sight paths from the candidate line of sight paths. In some example embodiments, a plurality of candidate LOS paths may be provided as an output of the algorithm 60. For example, a plurality of LOS paths may be identified by providing a beam index of each candidate LOS path.

In some embodiments, the one or more candidate LOS paths identified in operation 65 may be ranked in an optional operation 67.

In the operation 67, the candidate LOS paths may be ranked based on received power (e.g. RSRP). Power levels may be used to determine the most likely LOS path from a plurality of candidate LOS paths, since a lower power may indicate a side lobe of an NLOS connection (as discussed in detail below).

At optional operation 69, the path with the highest identified received power may be identified as the line of sight path (which path may or may not be the best path for communication). The operation 69 may output the identified LOS path (e.g. by providing a beam index of the identified line of sight path).

Figure 7:
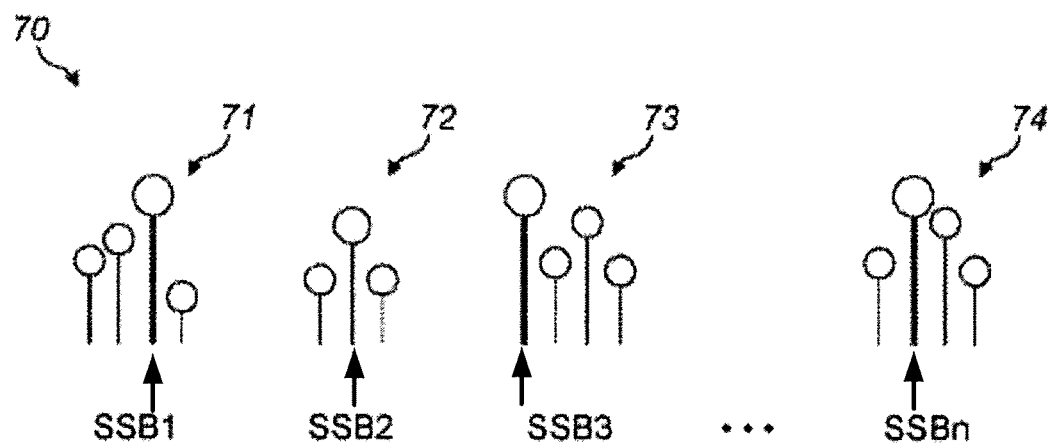
FIGS. 7 and 8 are block diagrams showing processing of data transmitted in accordance with an example embodiment.

FIG. 7 is a block diagram showing processing of data 70 transmitted using the system 50 in accordance with an example embodiment.

The data 70 includes first data 71 relating to a first synchronization symbol burst (SSB1), second data 72 relating to a second synchronization symbol burst (SSB2), third data 73 relating to a third synchronization symbol burst (SSB3) and fourth data 74 relating to an nth synchronization symbol burst (SSBn).

Synchronization Signal (SS) bursts may be sent by the base station 52 (e.g. gNB) periodically. The synchronization signals contain a specific number of SS blocks (SSB), e.g. up to 64 SSB for Frequency Range 2 (FR2). Each SSB spans 4 consecutive symbols. In a connected mode, the timing of each of the SSBs is known by both the base station 52 and the user device 54, i.e. periodicity of the burst and time interval between the blocks is known.

For each burst within the data, the timestamp of the strongest beam is recorded (indicated by the arrows SSB1, SSB2, SSB3 and SSBn in FIG. 7).

Figure 8:
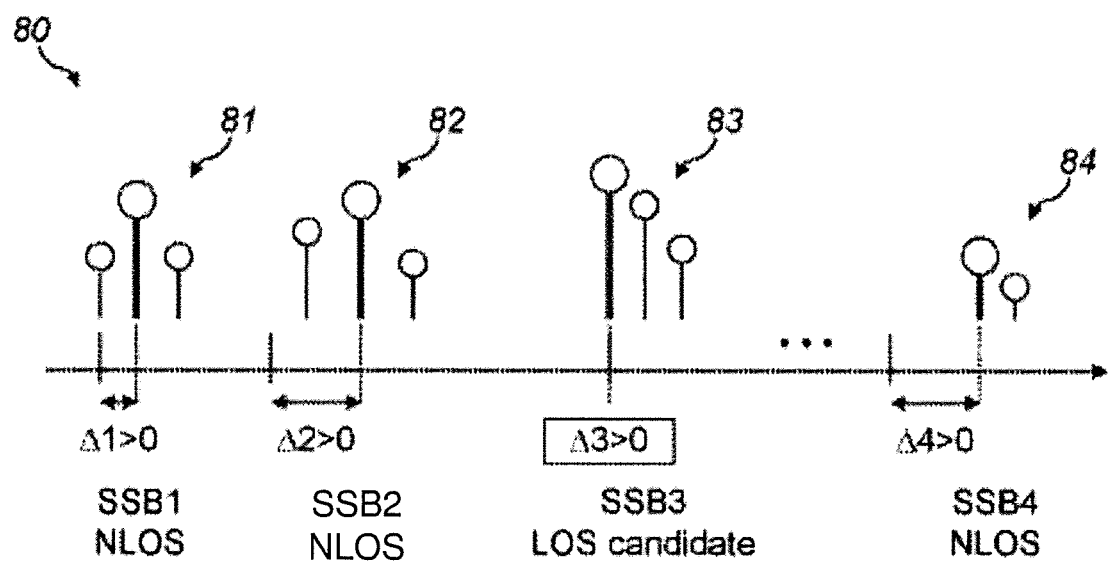

FIG. 8 is a block diagram showing processing of data 80 transmitted using the system 50 in accordance with an example embodiment. The processing of the data 80 shown in FIG. 8 determines an offset between scheduled and measured positions in time for each SSB.

The data 80 includes first data 81 relating to the first synchronization symbol burst (SSB1), second data 82 relating to the second synchronization symbol burst (SSB2), third data 83 relating to the third synchronization symbol burst (SSB3) and fourth data 84 relating to the fourth synchronization symbol burst (SSB4).

The first data 81 shows that the measured time of the received first synchronization symbol burst (SSB1) is later than the scheduled time of that burst. Thus, the SSB1 path is identified as a non-line of sight (NLOS) path.

Similarly, the second data 82 shows that the measured time of the received second synchronization symbol burst (SSB2) is later than the scheduled time of that burst. Thus, the SSB2 path is identified as a non-line of sight (NLOS) path.

The third data 83 shows that the measured time of the received third synchronization symbol burst (SSB3) is the same as the scheduled time of that burst. Thus, the SSB3 path is identified as a candidate line of sight (LOS) path.

Finally, the fourth data 84 shows that the measured time of the received fourth synchronization symbol burst (SSB4) is later than the scheduled time of that burst. Thus, the SSB4 path is identified as a non-line of sight (NLOS) path.

Thus, the algorithm, 60 proposes the use of Synchronisation Symbol (SS) bursts to identify NLOS paths and unveil the shortest path for propagation. Indeed, some paths might be discarded from a received power perspective though they provide highly relevant information for positioning.

In one example implementation, each SSB is scheduled to start at a specific symbol of the subframe. For example, each of 64 SSBs may be scheduled to start at {4, 8, 16, 20}+28*n, where n={0, 1, 2, 3, 5, 6, 7, 8, 10, 11, 12, 13, 15, 16, 17, 18}. Therefore, in the example system 50, the user device 54 knows when it should receive the blocks relative to each other. If some SSBs arrive later than expected, this may mean that the path that they followed has been delayed by a reflection (such that the paths are NLOS paths). The SSB that arrives the fastest follows the shortest path (i.e. a potential LOS path, if there is one). As discussed above with reference to FIGS. 3 and 4, it is not necessarily the path of maximum power that follows the shortest path. Finding the shortest path improves positioning by correcting the beam index or the delay calculation.

The algorithm 60 offers a direct way to rapidly exclude NLOS paths and to unveil the beam that follows the shortest path to the UE. The relevant base station can then infer if the connected beam is NLOS; and if there exists a shorter path to the user device.

In Frequency Range 2 (FR2) implementations with sub-carrier spacing (SCS) of 120 kHz, a user device (such as the user device 54 described above) uses a sampling rate of 2 ns. For the channel impulse response (CIR), this corresponds to being able to differentiate signals following paths that are just 60 cm apart. The user device computes the observed time difference of arrival (OTDOA) based on the CIR in the baseband receiver, as described below with reference to FIGS. 9 and 10.

Figure 9:
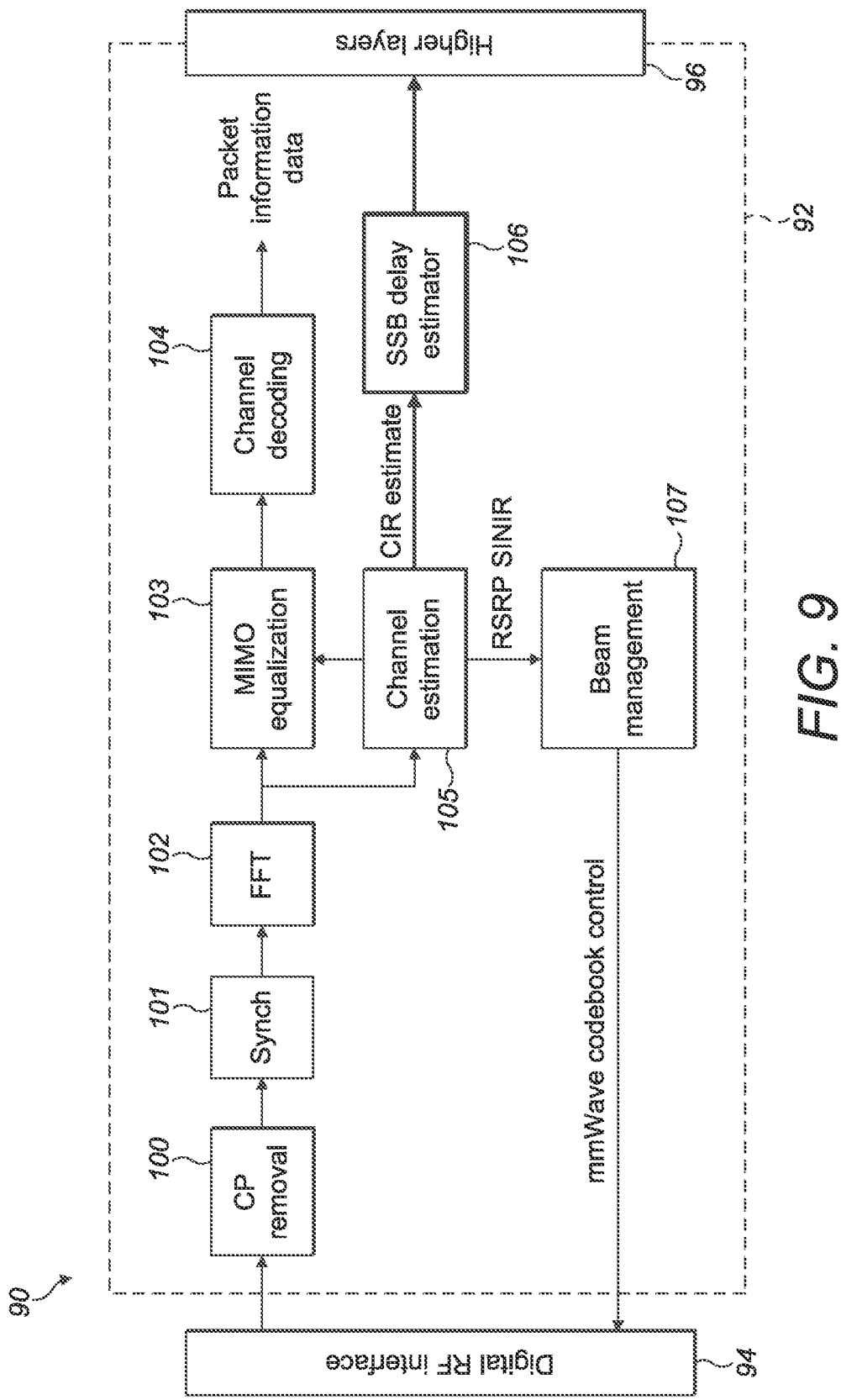
FIG. 9 is a block diagram of a system in accordance with an example embodiment.

FIG. 9 is a block diagram of a system, indicated generally by the reference numeral 90, in accordance with an example embodiment. The system 90 may be used to implement the algorithm 60 described above.

The system 90 comprises a baseband receiver module 92. The baseband receiver module 92 processes data received from a digital RF interface 94 and provides processed data both to the digital RF interface 94 and to higher layers 96 of a wider receiver system.

The baseband receiver module 92 comprises a cyclic prefix (CP) removal module 100, a synchroniser module 101, an FFT module 102, a MIMO equalization module 103, a channel decoding module 104, a channel estimation module 105, an SSB delay estimator module 106 and a beam management module 107.

The cyclic prefix module 100 transforms the digital signal received from the interface 94 into in-phase (I) and quadrature (Q) signals. Synchronization is performed (by the synchronization module 101) on the received primary synchronization signal (PSS) and secondary synchronization signal (SSS) blocks. The FFT module 102 applies a fast Fourier transform to the outputs of the synchronization module 101 in order to decode the incoming signal into soft values that are provided to the channel decoder module 104.

A derivative product of the frequency domain channel estimation is the time domain channel estimate (CIR) of each synchronization signal burst (SSB) sent. The channel estimate is then forwarded to the SSB delay estimator module 106. The SSB delay estimator module 106 identifies and stores the delay of the maximum power tap for each SSB of a given burst. The SSB delay estimator module 106 records the positions of the peak of the received signal in time and compares this time with the scheduled position for the specific beam index (as discussed above with reference to FIG. 8).

The SSB delay estimator module 106 then infers the beam ID of the shortest path and may determine the relevant delay correction factor (as discussed further below). For memory optimization purposes, the user device need not necessarily keep all channel estimates for all received SSBs, but may, for example, retain only the index and delay of the shortest path and compare with the next received path. If the next channel estimate is shorter, then data for this CIR may replace the stored data. The skilled person will be aware of alternative possible implementations.

Figure 10:
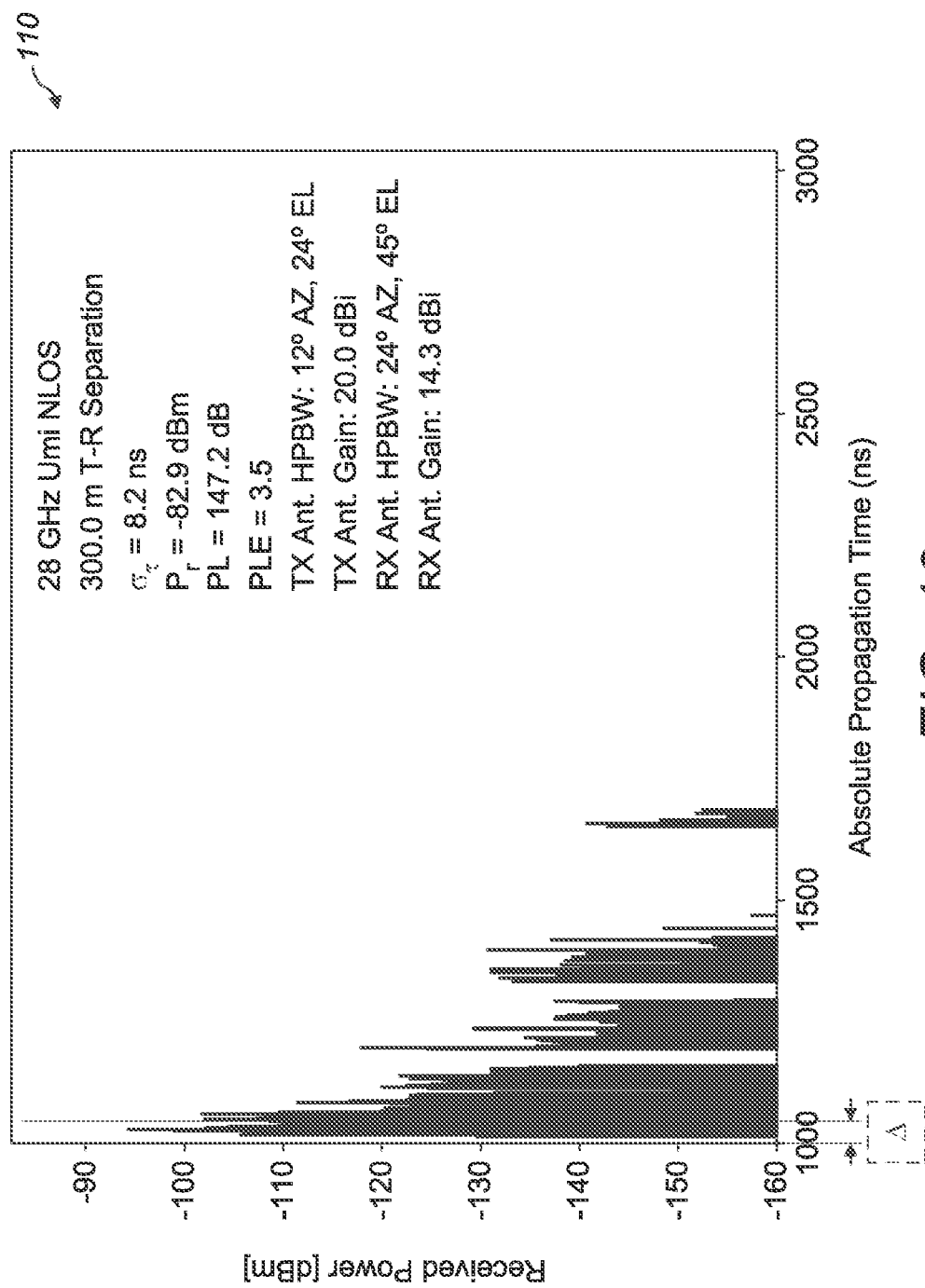
FIG. 10 is a plot in accordance with an example embodiment.

FIG. 10 is a plot, indicated generally by the reference numeral 110, in accordance with an example embodiment. The plot shows CIR data for an example simulation at 28 GHz. As shown, a propagation time period Δ to the peak received power is shown.

Thus, the operation 65 of the algorithm 60 described above may identify candidate LOS paths by: measuring a channel impulse response (CIR) for a received synchronisation symbol block; identifying a maximum power spike of the channel impulse response for each synchronisation symbol block; and comparing the time of the maximum power spike (i.e. the propagation time period Δ) to the expected reception time to identify the delay relative to said expected/scheduled reception time.

Figure 11:
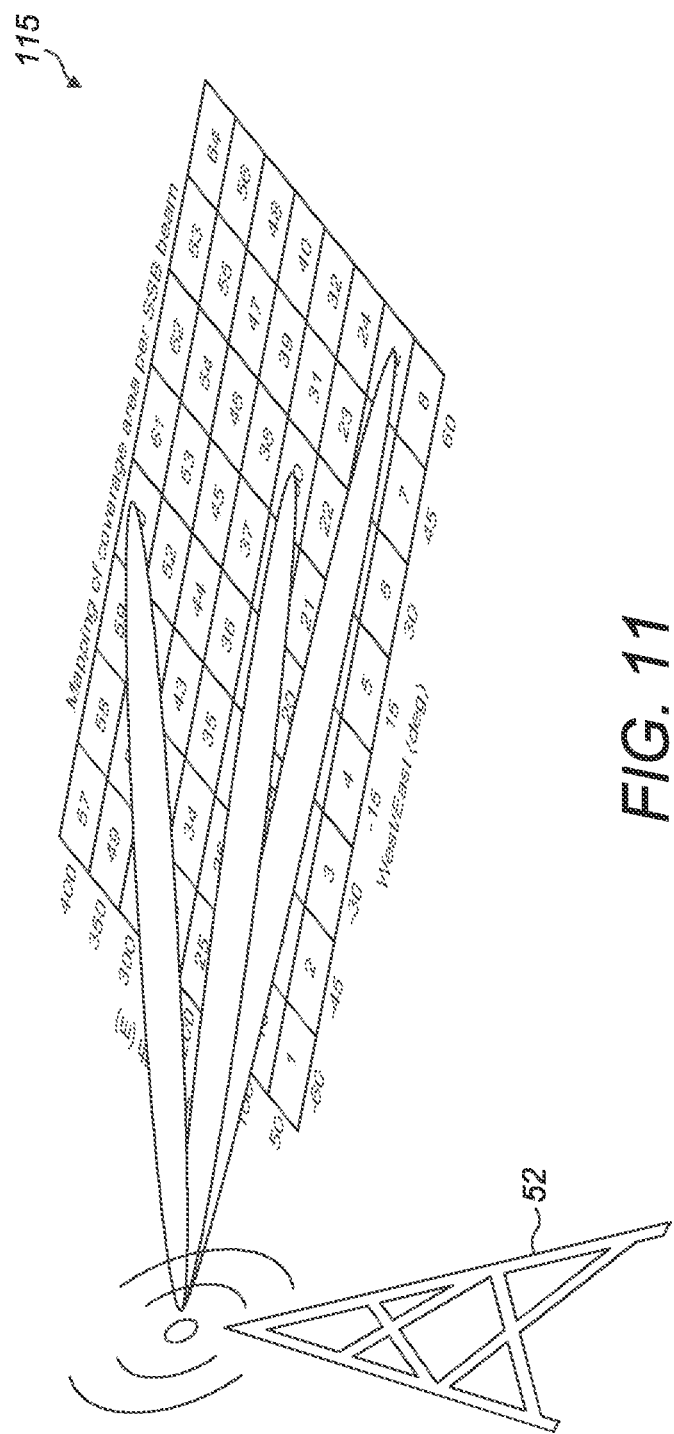
FIG. 11 shows a system in accordance with an example embodiment.

FIG. 11 show a system, indicated generally by the reference numeral 115, in accordance with an example embodiment.

The system 115 includes the base station 52 described above, which base station transmits synchronization signal bursts (SSBs). In one example, an FR2 base station sends out 64 SSB within one burst and covers a 120 degrees sector of a 400 m cell. The user device (e.g. the user device 54 described above) receives the burst and maps the delays with the SSB beam ID. Then, the user device identifies all paths having an offset larger than 0 ns as NLOS paths in order to identify candidate LOS paths (thereby implementing operation 65 of the algorithm 60 described above).

Figure 12:
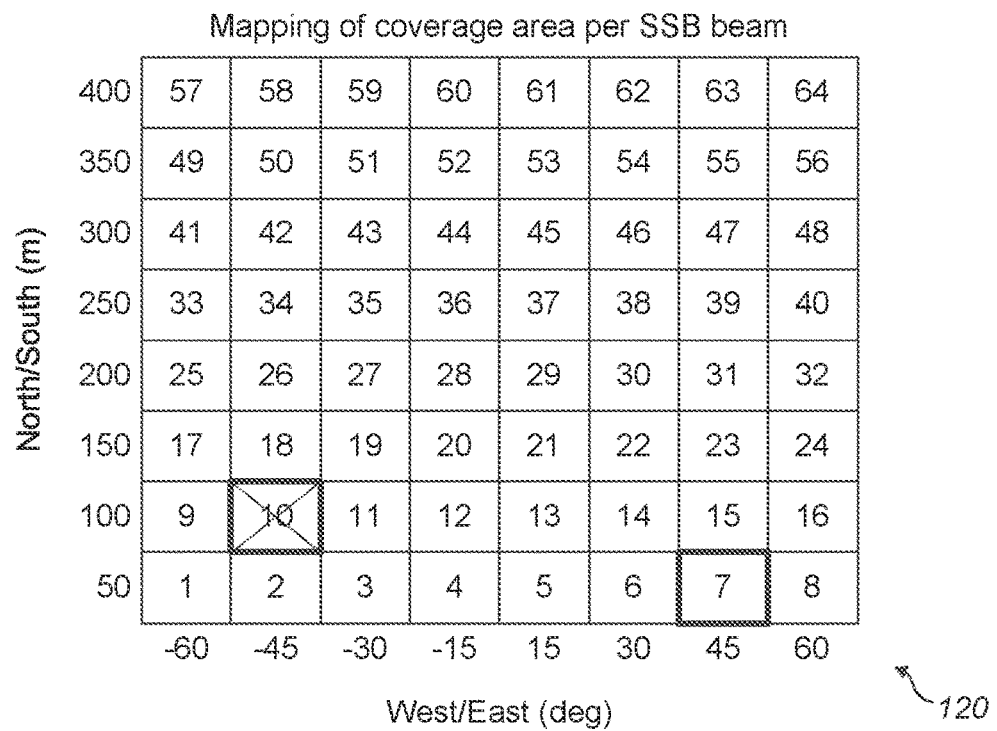
FIG. 12 shows data in accordance with example embodiments.

FIG. 12 shows data, indicated generally by the reference numeral 120, in accordance with an example embodiment. The data 120 maps SSB delays (as determined at the relevant user device) with SSB beam IDs.

The data 120 relates to a scenario in which SSB7 is the line of sight (LOS) beam, but SSB10 has the highest absolute received power. As shown in FIG. 12, a significant mistake may have been made if SSB10 had been selected as the likely LOS path (on the basis of having the highest absolute received power, i.e. without delay discrimination).

As discussed further below, several beams might follow the same path due to the antenna pattern at the base station exhibiting side lobes. For example, even though a main lobe of a base station (e.g. gNB) is not aligned with a particular user device, a side lobe might be. This phenomenon may result in several beam candidates following the shortest propagation path. However, as discussed above, the user can rank these candidates by received power and identify the beam received with 0 ns offset and maximum power (thereby distinguishing between main beams having a LOS path and side lobes having a LOS path). In this way, a suitable SSB beam can be identified as the LOS beam (thereby implementing operations 67 and 69 of the algorithm 60).

Figure 13:
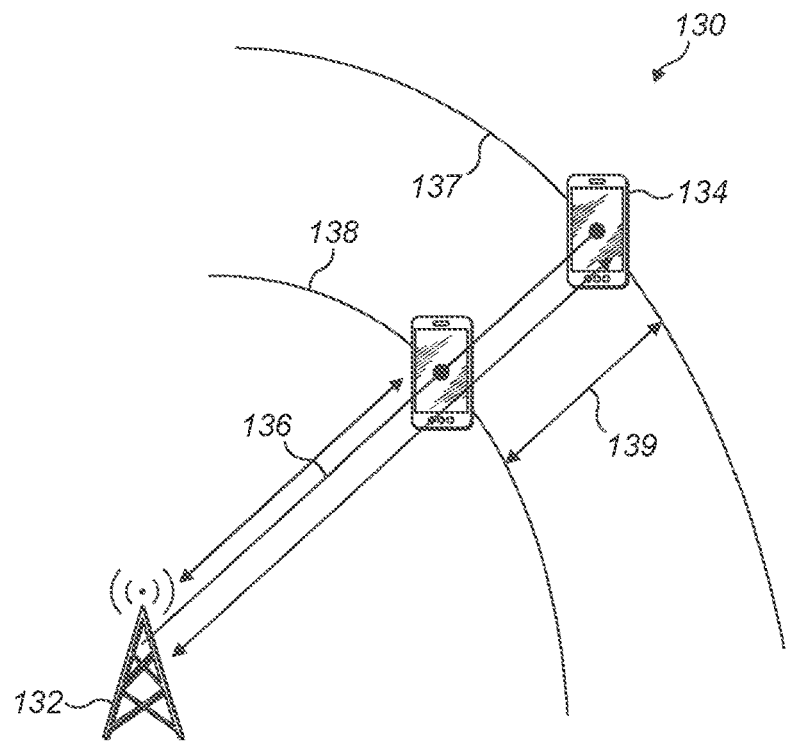
FIG. 13 is a block diagram of a system in accordance with an example embodiment.

FIG. 13 is a block diagram of a system, indicated generally by the reference numeral 130, in accordance with an example embodiment. The system 130 comprises a base station 132, or some similar communication node, in communication with a user device 134.

The system 130 shows a beam 136 used for communications between the base station 132 and the user device 134. On the assumption that the beam 136 is a line of sight (LOS) beam, then the distance between the base station 132 and the user device 134 can be estimated based on the time delay of signals transmitted using the beam 136. For example, in the system 130, the user device may be calculated as being at a distance from the base station 132 indicated by the arc 137. Using transmission from multiple base stations and the user device 134, an estimate of the absolute position of the user device 134 can be made using triangulation.

As discussed above, the beam used for transmission of data between the base station 132 and the user device 134 may be a non-line of sight (NLOS) beam. If so, the user device 134 may be closer to the base station 132 that would be suggested by assuming that the beam 136 is a LOS beam. Thus, the user device 134 may, in fact, be location at a distance from the base station 132 indicated by the arc 138.

The difference in distance between the arc 137 and the arc 138 may be defined as a correction factor 139. The corrected path is the distance represented by the arc 138.

As discussed above, by determining a line of sight path, then the apparent position of the device (indicated by the NLOS beam) and the actual position of the device (indicated by the LOS beam) can be determined. Moreover, a correction factor between the apparent position of the user device and its actual position can be calculated. This correction factor can be used to obtain more accurate positions of devices (for example, by using the correction factor in a triangulation algorithm).

Thus, the user device can calculate a corrected delay once it has identified a shorter path (such as the path 138). That corrected delay can be output by the user device (for example to the base station 132). Alternatively, or in addition, the user device 134 can calculate the delay correction factor 139 and output that delay correction factor (for example to the base station 132). On receipt of a delay correction factor, the base station 132 (or some other communication node) can determine a corrected delay by summing a previous delay estimate and the correction factor.

Figure 14:
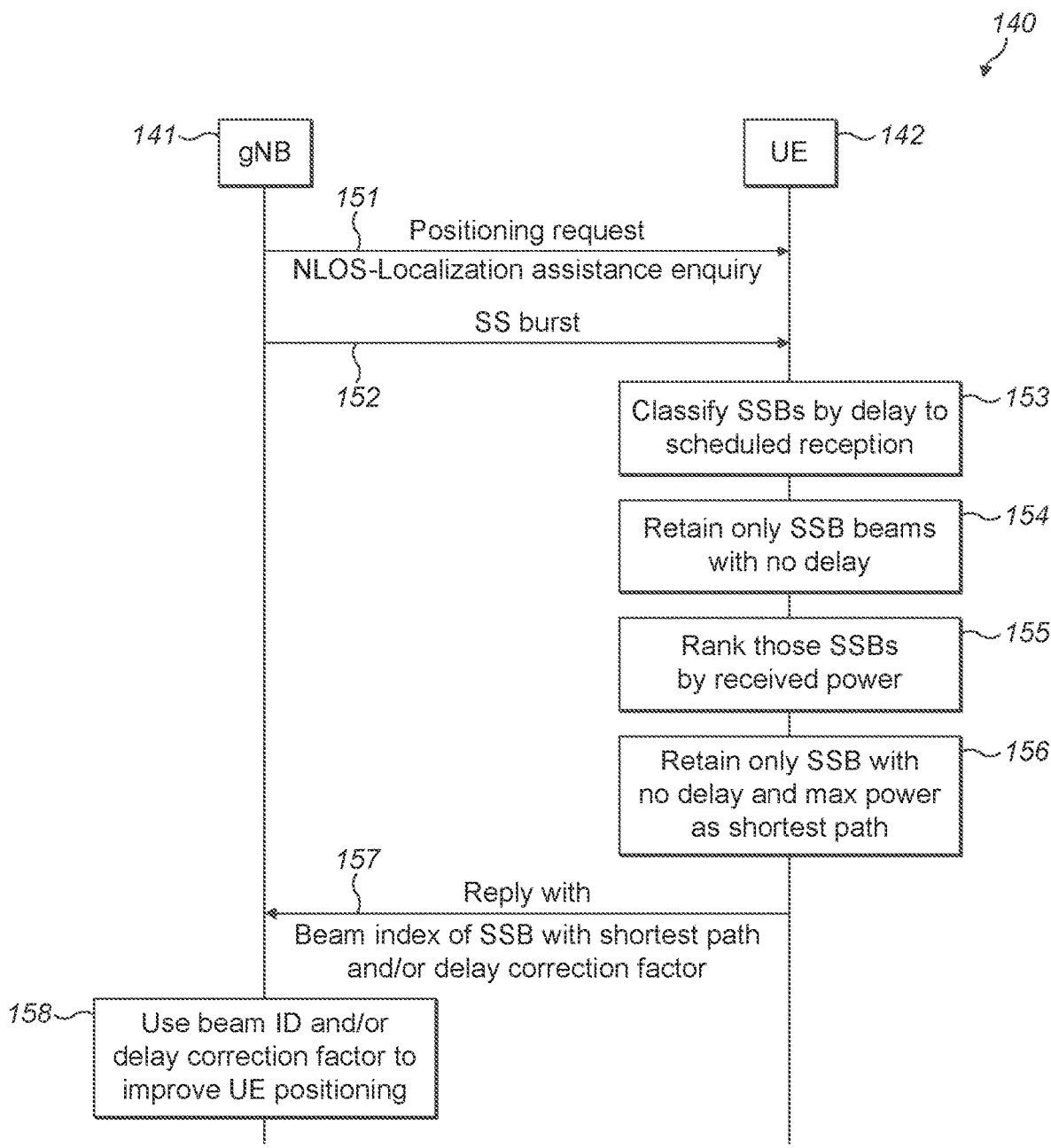
FIG. 14 is a message sequence in accordance with an example embodiment.

FIG. 14 is a message sequence, indicated generally by the reference numeral 140, in accordance with an example embodiment. The message sequence 140 shows messages transmitted between a communication node 141 (e.g. gNB) and a user device 142.

As described in detail below, the message sequence 140 may include a request 151 sent by the communication node 141 (such as a base station, e.g. a gNB) to the user device 142 for a beam ID having a shortest path to the user device 142 and/or a delay correction factor. In response to the request 151, a reply 157 is received that includes the requested beam ID (of the shortest path) and/or the requested delay correction factor. (Note that, as described above, in addition to, or instead of, providing a delay correction factor, the reply 157 could include a corrected delay).

In the message sequence 140, a burst comprising a plurality of synchronisation symbol blocks (SSBs) is received at the user device 142 from the communication node 141 (see the message 152 of the message sequence 140). As described above, in the connected mode, the timings of the synchronisation signals that form the burst are known both on the transmitter side (i.e. at the communication node 141) and at the receiver side (i.e. at the user device 142).

In one example embodiments, 64 SSBs might be sent and a particular user device might receive several, with many following NLOS paths and perhaps one or a few following LOS paths.

On reception of the SSBs, a number of functions may be implemented at (or under the control of) the user device 142, as indicated by the functional blocks 153 to 156 discussed below.

At block 153, the synchronisation symbol blocks received at the user device 142 may be classified based on delay relative to an expected or scheduled reception time.

At block 154, the classification based on delay may be used to identify one or more candidate line of sight (LOS) beams. For example, NLOS paths may be identified and excluded from a list of candidate line of sight paths.

The identification (of either LOS paths or NLOS paths) may be implemented by determining a position in time for each received symbol block relative to a scheduled position in time for that block, as discussed above. For example, NLOS paths may be identified by identifying paths conveying synchronisation symbol blocks having a delay relative to the scheduled reception time in excess of a threshold amount.

The block 154 may, for example, determine a beam index for the or each candidate LOS path.

At block 155, the candidate line of sight (LOS) path(s) may be ranked by received power (e.g. on the basis of Reference Signal Receive Power (RSRP), or some other metric of receiver power). For example, the path with the highest identified received power may be identified as the line of sight path (since lower power may be indicative of transmission from a side lobe). Note that, as discussed in detail above, the shortest (i.e. line of sight) path may not be the best path for communication.

At block 156, the synchronisation symbol blocks (SSBs) without delays (i.e. the candidate LOS paths identified at block 154) and with maximum power (as identified at block 156) is retained.

At message 157, a response to the request 151 is sent to the communication node 141. The response may identify the SSB identified in block 156 (e.g. by providing a beam index to the identified path). Alternatively, or in addition, the message 157 may include the delay correction factor or a corrected delay for the identified beam.

At block 158, the communication node 141 makes use of the message 157. For example, the identified LOS path and/or the delay correction factor may be used to improve positioning of the user device 142 (e.g. as part of a triangulation algorithm).

In one example embodiment, the message sequence 140 is used to provide a localisation assistance enquiry (that is provided by the communication node 141 and received at the user device 142), in response to which a beam index and/or a delay correction factor of line of sight path is provided by the user device to the communication node.

Figure 15:
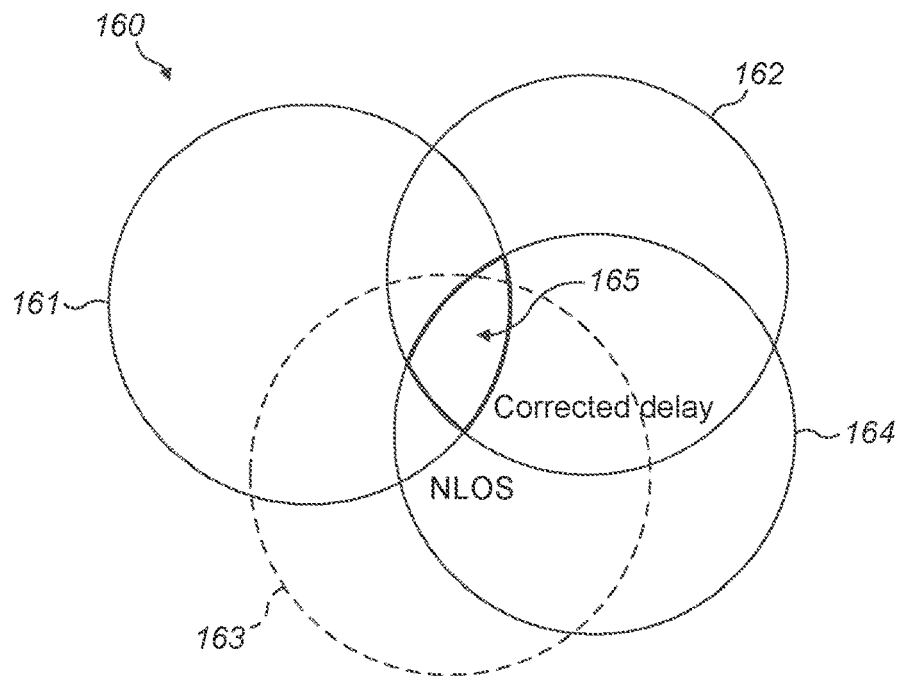
FIG. 15 is a plot showing an example uses of systems in accordance with an example embodiment.

FIG. 15 is a plot, indicated generally by the reference numeral 160, showing an example uses of systems in accordance with an example embodiment.

The plot 160 shows a first circle 161 that is a first position estimate for a user device, a second circle 162 that is a second position estimate for the user device and a third circle 163 that is a third position estimate for the user device. The intersection of the circles 161 to 163 provides the best estimate of the user device positioning.

Assume that the position estimates 161 to 163 are generated using delay estimates for LOS paths, as described above, but that the third position estimate is based on an NLOS path and is therefore inaccurate.

In the event that a delay correction factor is provided for the third estimate 163 (indicating a time or distance error due to the use of an NLOS path), then the relative position of the third circle 163 can be corrected—as indicated by the fourth circle 164 in the plot 160. By correcting the position estimate 164, an overlap region 165 providing an estimate of the position of the user device can be improved.

Thus, the identified of NLOS and LOS paths and a delay correction factor can be used for localization assistance.

Figure 16:
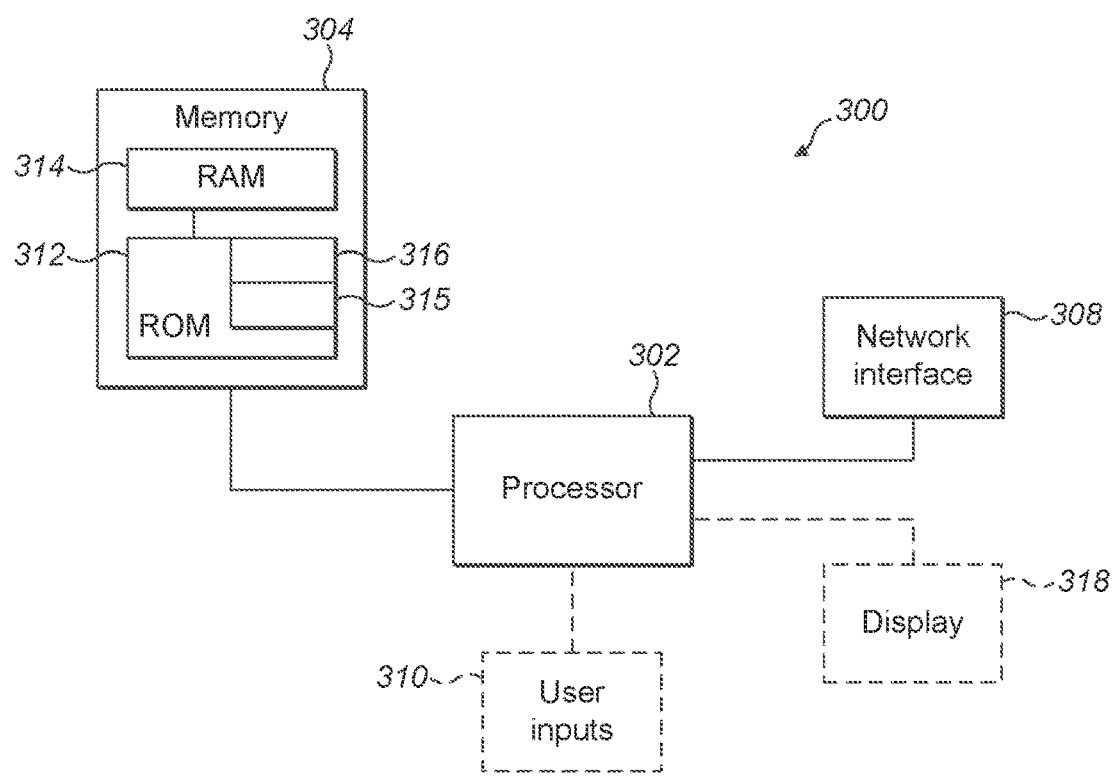
FIG. 16 is a block diagram of components of a system in accordance with an example embodiment.

For completeness, FIG. 16 is a schematic diagram of components of one or more of the example embodiments described previously, which hereafter are referred to generically as a processing system 300. The processing system 300 may, for example, be the apparatus referred to in the claims below.

The processing system 300 may have a processor 302, a memory 304 closely coupled to the processor and comprised of a RAM 314 and a ROM 312, and, optionally, a user input 310 and a display 318. The processing system 300 may comprise one or more network/apparatus interfaces 308 for connection to a network/apparatus, e.g. a modem which may be wired or wireless. The interface 308 may also operate as a connection to other apparatus such as device/apparatus which is not network side apparatus. Thus, direct connection between devices/apparatus without network participation is possible.

The processor 302 is connected to each of the other components in order to control operation thereof.

The memory 304 may comprise a non-volatile memory, such as a hard disk drive (HDD) or a solid state drive (SSD). The ROM 312 of the memory 304 stores, amongst other things, an operating system 315 and may store software applications 316. The RAM 314 of the memory 304 is used by the processor 302 for the temporary storage of data. The operating system 315 may contain code which, when executed by the processor implements aspects of the algorithms and message sequences 60 and 140 described above. Note that in the case of small device/apparatus the memory can be most suitable for small size usage i.e. not always a hard disk drive (HDD) or a solid state drive (SSD) is used.

The processor 302 may take any suitable form. For instance, it may be a microcontroller, a plurality of microcontrollers, a processor, or a plurality of processors.

The processing system 300 may be a standalone computer, a server, a console, or a network thereof. The processing system 300 and needed structural parts may be all inside device/apparatus such as IoT device/apparatus i.e. embedded to very small size.

In some example embodiments, the processing system 300 may also be associated with external software applications. These may be applications stored on a remote server device/apparatus and may run partly or exclusively on the remote server device/apparatus. These applications may be termed cloud-hosted applications. The processing system 300 may be in communication with the remote server device/apparatus in order to utilize the software application stored there.

Figure 17A:
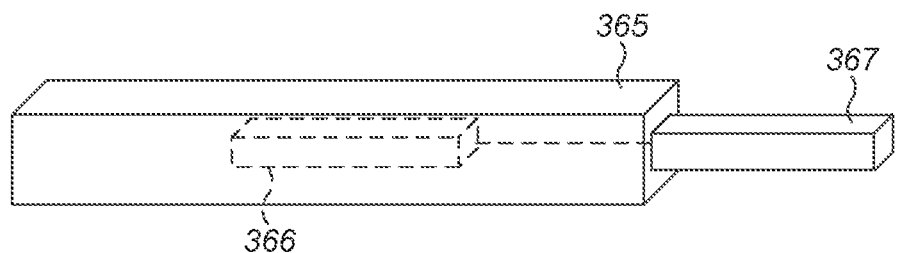
FIGS. 17A and 17B show tangible media, respectively a removable non-volatile memory unit and a Compact Disc (CD) storing computer-readable code which when run by a computer perform operations according to example embodiments.
Figure 17B:
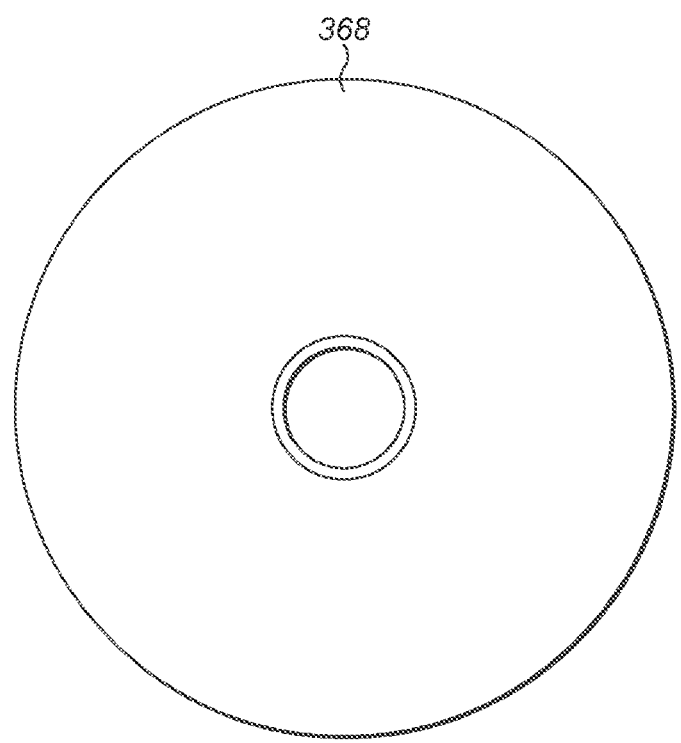

FIGS. 17A and 17B show tangible media, respectively a removable memory unit 365 and a compact disc (CD) 368, storing computer-readable code which when run by a computer may perform methods according to example embodiments described above. The removable memory unit 365 may be a memory stick, e.g. a USB memory stick, having internal memory 366 storing the computer-readable code. The internal memory 366 may be accessed by a computer system via a connector 367. The CD 368 may be a CD-ROM or a DVD or similar. Other forms of tangible storage media may be used. Tangible media can be any device/apparatus capable of storing data/information which data/information can be exchanged between devices/apparatus/network.

Embodiments of the present invention may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any non-transitory media or means that can contain, store, communicate, propagate or transport the instructions for use by or in connection with an instruction execution system, apparatus, or device, such as a computer.

Reference to, where relevant, "computer-readable medium", "computer program product", "tangibly embodied computer program" etc., or a "processor" or "processing circuitry" etc. should be understood to encompass not only computers having differing architectures such as single/multi-processor architectures and sequencers/parallel architectures, but also specialised circuits such as field programmable gate arrays FPGA, application specify circuits ASIC, signal processing devices/apparatus and other devices/apparatus. References to computer program, instructions, code etc. should be understood to express software for a programmable processor firmware such as the programmable content of a hardware device/apparatus as instructions for a processor or configured or configuration settings for a fixed function device/apparatus, gate array, programmable logic device/apparatus, etc.

If desired, the different functions discussed herein may be performed in a different order and/or concurrently with each other. Furthermore, if desired, one or more of the above-described functions may be optional or may be combined. Similarly, it will also be appreciated that the flow diagrams and message sequences of FIGS. 6 and 14 are examples only and that various operations depicted therein may be omitted, reordered and/or combined.

It will be appreciated that the above described example embodiments are purely illustrative and are not limiting on the scope of the invention. Other variations and modifications will be apparent to persons skilled in the art upon reading the present specification.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

Although various aspects of the invention are set out in the independent claims, other aspects of the invention comprise other combinations of features from the described example embodiments and/or the dependent claims with the features of the independent claims, and not solely the combinations explicitly set out in the claims.

It is also noted herein that while the above describes various examples, these descriptions should not be viewed in a limiting sense. Rather, there are several variations and modifications which may be made without departing from the scope of the present invention as defined in the appended claims.

The invention claimed is:

1. An apparatus comprising at last one processor and at least one memory storing instructions that, when executed by the at least one processor, cause the apparatus to perform:
   receiving a plurality of synchronisation symbol blocks sent in different blocks of symbols at different times using different beams;
   classifying the received synchronisation symbol blocks based on corresponding delays relative to corresponding expected reception times for corresponding ones of the synchronisation symbol blocks; and
   identifying, based on the classifying, one or more candidate line of sight paths for the synchronisation symbol blocks and their corresponding beams on the basis of the corresponding delays relative to the corresponding expected reception times, wherein the identifying comprises:
   measuring channel impulse responses for the received synchronisation symbol blocks;
   identifying a maximum power spike and associated time of a corresponding channel impulse response for each received synchronisation symbol block; and
   comparing, for the received synchronisation symbol blocks, the associated times of the maximum power spikes to the expected reception times to identify corresponding delays relative to the corresponding expected reception times.

2. The apparatus as claimed in claim 1 wherein the at least one memory comprises stored instructions that, when executed by the at least one processor, cause the apparatus to provide an output identifying each of the candidate line of sight paths.

3. The apparatus as claimed in claim 1 wherein the at least one memory comprises stored instructions that, when executed by the at least one processor, cause the apparatus to:
   identify non-line of sights paths conveying synchronisation symbol blocks having corresponding delays relative to the corresponding expected reception times in excess of a threshold amount; and
   exclude the identified non-line of sight paths from the candidate line of sight paths.

4. The apparatus as claimed in claim 1 wherein there are multiple candidate line of sight paths and wherein the at least one memory comprises stored instructions that, when executed by the at least one processor, cause the apparatus to rank the multiple candidate line of sight paths by received power.

5. The apparatus as claimed in claim 4 wherein the at least one memory comprises stored instructions that, when executed by the at least one processor, cause the apparatus to identify the path with the highest identified received power as a shortest path and to provide an output identifying said shortest path.

6. The apparatus as claimed in claim 1 wherein the at least one memory comprises stored instructions that, when executed by the at least one processor, cause the apparatus to perform calculating one or both of a corrected delay or a delay correction factor.

7. The apparatus as claimed in claim 6, wherein calculating the delay correction factor comprises determining a relative time difference between a communication path based on a non-line of sight path and a shortest path.

8. The apparatus as claimed in claim 1 wherein the at least one memory comprises stored instructions that, when executed by the at least one processor, cause the apparatus to determine a beam index of one or both of a shortest path or each candidate line of sight path.

9. The apparatus as claimed in claim 1 wherein the at least one memory comprises stored instructions that, when executed by the at least one processor, cause the apparatus to:
   receive a localisation assistance enquiry; and
   provide one or more of a beam index, a delay correction factor or a corrected delay of a shortest path in response to said localisation assistance enquiry.

10. A method comprising:
    receiving a plurality of synchronisation symbol blocks sent in different blocks of symbols at different times using different beams;
    classifying the received synchronisation symbol blocks based on corresponding delays relative to corresponding expected reception times for corresponding ones of the synchronisation symbol blocks; and
    identifying, based on the classifying, one or more candidate line of sight paths for the synchronisation symbol blocks and their corresponding beams on the basis of the corresponding delays relative to the corresponding expected reception times, wherein the identifying comprises:
    measuring channel impulse responses for the received synchronisation symbol blocks;
    identifying a maximum power spike and associated time of a corresponding channel impulse response for each received synchronisation symbol block; and
    comparing, for the received synchronisation symbol blocks, the associated times of the maximum power spikes to the expected reception times to identify corresponding delays relative to the corresponding expected reception times.

11. The method as claimed in claim 10 further comprising: providing an output identifying each of the candidate line of sight paths.

12. The method as claimed in claim 10 further comprising:
    identifying non-line of sights paths conveying synchronisation symbol blocks having corresponding delays relative to the corresponding expected reception times in excess of a threshold amount; and
    excluding the identified non-line of sight paths from the candidate line of sight paths.

13. The method as claimed in claim 10 further comprising: ranking one or more of the candidate line of sight paths by received power.

14. The method as claimed in claim 13 further comprising: identifying the path with the highest identified received power as a shortest path and providing an output identifying said shortest path.

15. The method as claimed in claim 10 further comprising: calculating one or both of a corrected delay or a delay correction factor.

16. A non-transitory computer-readable medium comprising program instructions stored thereon to cause an apparatus to perform at least the following:
    receiving a plurality of synchronisation symbol blocks sent in different blocks of symbols at different times using different beams;
    classifying the received synchronisation symbol blocks based on corresponding delays relative to corresponding expected reception times for corresponding ones of the synchronisation symbol blocks; and identifying, based on the classifying, one or more candidate line of sight paths for the synchronisation symbol blocks and their corresponding beams on the basis of the corresponding delays relative to the corresponding expected reception times, wherein the identifying comprises:

measuring channel impulse responses for the received synchronisation symbol blocks;

identifying a maximum power spike and associated time of a corresponding channel impulse response for each received synchronisation symbol block; and comparing, for the received synchronisation symbol blocks, the associated times of the maximum power spikes to the expected reception times to identify corresponding delays relative to the corresponding expected reception times.

17. The apparatus as claimed in claim 1, wherein each synchronisation symbol block starts at a specific one of a plurality of symbols in a subframe.

18. The apparatus as claims in claim 17, wherein each synchronisation symbol block and corresponding beam is sent in a different direction.

* * * * *